Aug. 22, 1967  H. G. LATTKE  3,336,727
APPARATUS FOR SHRINK FILM WRAPPING OF TRAYED ARTICLES
Filed Dec. 8, 1964  2 Sheets-Sheet 2
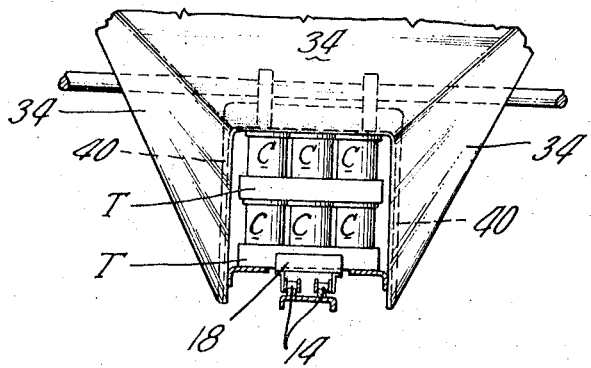
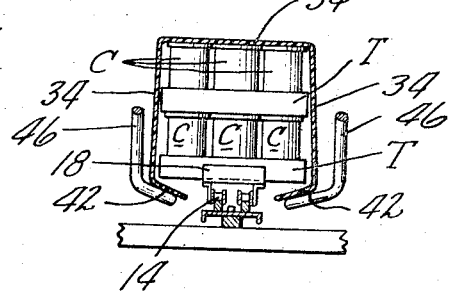
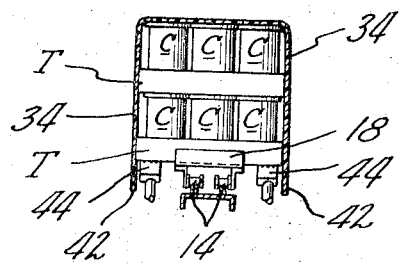
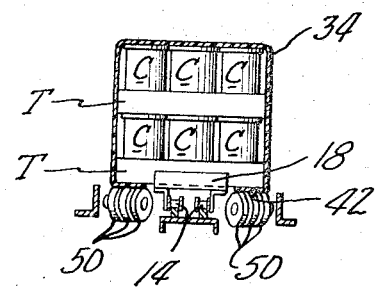
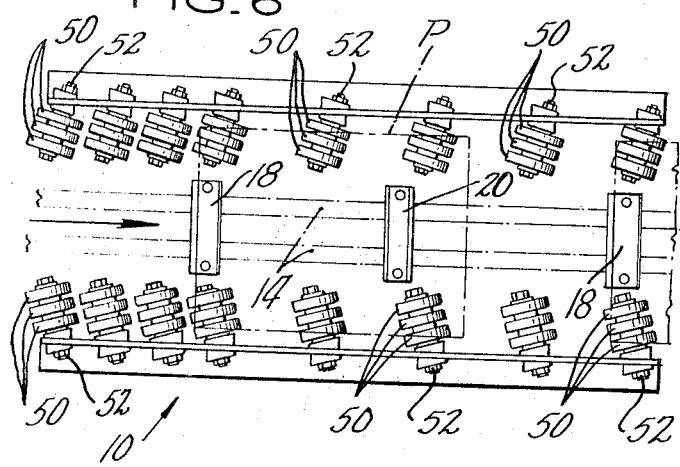
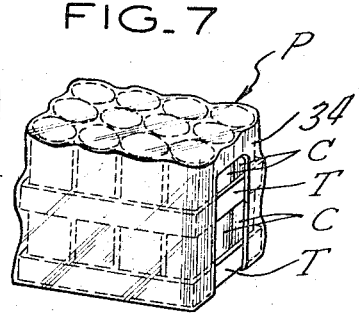
INVENTOR
HORST G. LATTKE
BY McCormick, Paulding & Huber
ATTORNEYS

United States Patent Office 3,336,727
Patented Aug. 22, 1967

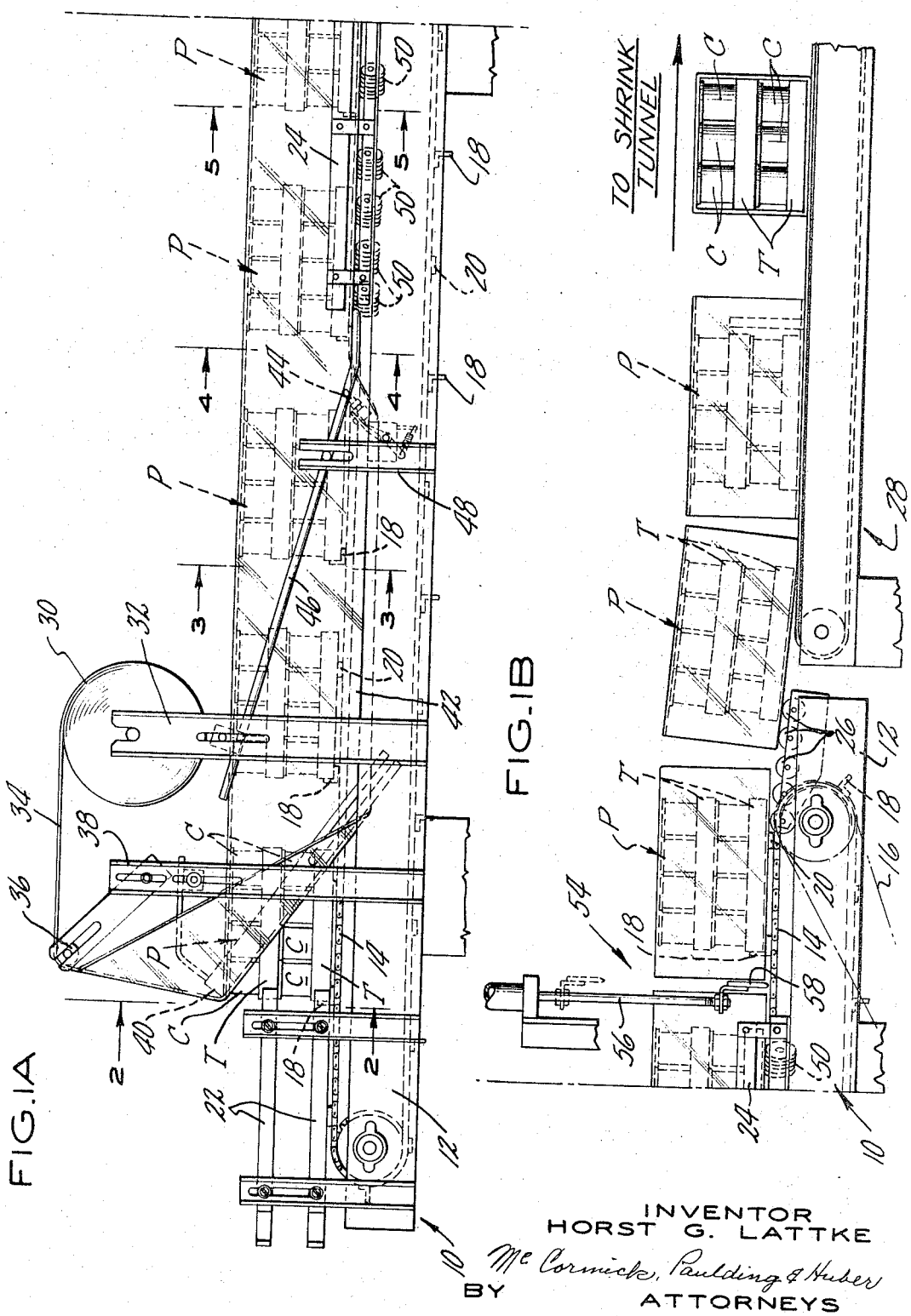

3,336,727
APPARATUS FOR SHRINK FILM WRAPPING OF TRAYED ARTICLES
Horst G. Lattke, Middletown, Conn., assignor to Emhart Corporation, Bloomfield, Conn., a corporation of Connecticut
Filed Dec. 8, 1964, Ser. No. 416,856
4 Claims. (Cl. 53—198)

ABSTRACT OF THE DISCLOSURE

An apparatus for shrink film wrapping articles being advanced on a conveyor in spaced apart packs supported on trays wherein the film is supplied from a roll and advanced with the packs. The film covers top and sides of the packs and is folded and glued onto the bottom of the trays. Then, the film is cut between successive trays and shrunk onto the packs at the top, sides and ends by the application of heat.

---

This invention relates to the casing of packs of articles such as metal food containers and, more particularly, to an apparatus for wrapping such packs in a transparent film material prior to shrinking the material into drum tight contact with the packs.

For quite some time, relatively small and lightweight articles which have been loaded in trays or placed on chip boards have been wrapped in clear plastic film which is later shrunk by exposure to heat to draw the film tightly around the articles and associated tray or chip board. More recently, attempts have been made to similarly case or enclose packs of heavier articles such as metal containers for food stuffs, but considerable difficulty has been encountered in providing an apparatus which will wrap the proper film around these relatively large and heavy packs at sufficient speed for modern high production operation.

It has been found that in using a polyvinyl-chloride shrink film, a twenty-four can case or pack of containers can be wrapped and the film then shrunk to provide an easily handled case or package. Preferably, the cans are loaded in two trays, 12 cans to a tray, with one tray and its cans placed over the other tray and its cans to provide a double tier composite pack. Then, when the film is wrapped around the complete pack to cover the top and the sides thereof, the pack can be easily handled after shrinking of the film into drum tight relationship by gripping the bottom tray. It has also been found that when such a double tier pack has been similarly wrapped but with an opening at the ends of the pack, the pack can be handled by gripping either the lower or upper tray.

There are several advantages obtained by wrapping trayed articles with a rugged shrink film which can be drawn or shrunk drum tight. For example, the contents can readily be observed through the clear film, the film can easily be cut for removal and opening of the pack without damage to the contents, the packs are lighter than when enclosed in a conventional fiber board case, and the trays can often be re-used and easily stored where the conventional cases could not.

It is the general object of the present invention to provide an apparatus for wrapping the shrink film material (polyvinyl-chloride) around the packs at very high speed and in a substantially foolproof manner. In keeping with this general object, there is provided a conveyor for advancing packs of articles longitudinally and in spaced apart relationship. A roll of the shrink film material is supported over the conveyor and the advancing packs thereon and the leading edge of the film is advanced with the foremost pack, the said leading edge being slightly ahead of the said foremost pack. The film is guided off the roll and over the tops of the advancing packs and at the same time, the film is folded downwardly at the longitudinal sides of the packs so that its longitudinal marginal edges extend below the packs on the conveyor. Glue is then applied to the longitudinal marginal portions of the passing packs and the marginal portions of the film are folded inwardly onto the glued marginal portions of the packs at the sides thereof. Then, the film is drawn more tightly around the pack by means which also apply pressure to the glued areas. Thus, a series of advancing packs are enclosed by the moving film, and the film is severed between adjacent packs before the packs and film are exposed to heat for shrinking the film into drum tight contact with each pack.

The drawings show a preferred embodiment of the invention and such embodiment will be described, but it will be understood that various changes may be made from the construction disclosed, and that the drawings and description are not to be construed as defining or limiting the scope of the invention.

Of the drawings:
FIG. 1A is a rather schematic elevational view of the conveyor and apparatus for wrapping film around packs moving along the conveyor, the figure being taken at the upstream end portion of the conveyor;
FIG. 1B is similar to FIG. 1A but shows the downstream end of the conveyor;
FIG. 2 is a transverse vertical sectional view taken as indicated by the line 2—2 of FIG. 1A;
FIG. 3 is a transverse vertical sectional view taken as indicated by the line 3—3 of FIG. 1A;
FIG. 4 is a transverse vertical sectional view taken as indicated by the line 4—4 of FIG. 1A;
FIG. 5 is a transverse vertical sectional view taken as indicated by the line 5—5 of FIG. 1A;
FIG. 6 is a top plan view of a portion of the conveyor showing particularly the rollers used in tightening the film around the packs; and
FIG. 7 is a perspective view of a pack which has been wrapped and the film shrunk thereon.

As shown in FIGS. 1A and 1B, the apparatus provided in accordance with the present invention comprises a longitudinally extending conveyor 10 which is used to advance packs P, P of articles in longitudinally spaced apart relationship. For purposes of illustration, a pack P is shown to comprise two tiers of cans C, C, each such tier of cans being supported in a tray T. Preferably, there are twelve cans or containers in each tier so that the pack P has the usual number (24) of cans included in a conventional case.

The conveyor 10 includes an elongated suitably supported table 12 which provides support for the endless chains 14 of a flight bar type conveying mechanism which is driven by a chain and sprocket unit 16 off a drive motor which is not shown. There are a plurality of such chains provided which extend longitudinally to support regularly longitudinally spaced flight bars 18, 18 and regularly longitudinally spaced transversely extending support bars 20, 20 for supporting and advancing the packs P, P from left to right as viewed in FIGS. 1A and 1B. The upper extent of the said flight bar chains 14, 14 are suitably supported to bear the weight of the said packs. The conveyor mechanism 10 also includes guide rails 22, 22 which are positioned over the flight bar mechanism at the upstream end of the conveyor to guide the packs P, P at the initial part of their passage. An additional pair of guide rails such as the rail 24 is supported farther downstream on the conveyor to provide an additional guide for the packs, and at the downstream end of the conveyor 10, transversely supported conveyor rollers 26, 26, are arranged at an incline to move the packs off the conveyor 10 and onto a second driven conveyor 28. The second conveyor 28 moves the packs into a shrink tunnel (not shown) after they have been wrapped with the shrink film. The film and packs are subjected to heat in the shrink tunnel to shrink the film into drum tight engagement on the packs.

The shrink film material is provided in a roll 30 which is rotatably supported over the conveyor 10 and the packs being advanced thereon by suitable frame structure 32. The axis of the roll 30 is disposed transversely of the conveyor, and the web of film 34, which is provided in sufficient width to more than cover the top and sides of the packs P, P, is removed from the roll 30 toward the upstream end of the conveyor 10. The web is then fed downwardly over a roll 36 which is adjustably supported over the conveyor 10 on frame structure 38. After passing downwardly from the roll 36, the shrink film web is fed through an inverted U-shaped guide 40 and it is then advanced with the packs P, P downstream or in the longitudinal direction of the conveyor.

The inverted U-shaped guide 40 is also adjustably supported by the frame structure 38 so that it will straddle the packs being advanced on the conveyor. It will be noted that the U-shaped guide 40 is inclined toward the upstream end of the conveyor 10. The inclined disposition of the guide is provided so that the shrink film web 34 in passing through the guide over the moving packs will be folded downwardly at the sides of the pack to present an inwardly facing marginal portion of the film 42 extending downwardly beyond the packs P, P at each side thereof. It has been found that the angle of inclination of the guide 40 to the longitudinal path of the packs should be no more than 45°. If the said angle exceeds 45°, the film is not easily folded downwardly on both sides of the advancing packs from the top thereof. Preferably, the angle of inclination is approximately 35°.

Initially, the film web 34 is drawn manually from the roll 30 and through the inverted U-shaped guide 40 with the leading edge of the film at least slightly ahead of the foremost pack in a series of packs P, P being advanced or moved in spaced apart relationship along the conveyor 10. As the packs and film move ahead, the foremost pack and each succeeding pack will pass over a pair of suitable glue nozzles 44, there being one such nozzle located at each side of the conveyor 10. These glue nozzles are so supported and arranged as to apply glue to the longitudinal marginal portions at the bottom of each pack passing the nozzles and on each side thereof. In other words, the nozzles 44 apply a strip of glue adjacent the marginal edges of the bottom tray T of each passing pack P. This longitudinal marginal portion at the side of each pack and on the bottom thereof is adjacent a longitudinal marginal portion 42 of the film.

As the film and each pack pass the pair of nozzles 44, the longitudinal marginal portion 42 of the film at each side is folded inwardly onto the adjacent glued longitudinal marginal portion at the bottom of the pack. The film is folded inwardly by a plow 46 which is supported in part by the frame structure 32 and by additional frame structure 48, there being one such plow located at each side of the conveyor downstream of the nozzles. When the marginal portions 42 of the film strip or web are folded inwardly at the sides of the advancing packs, a glued connection is effected therewith. It has been found that an economical "cold" glue can be used for securing the film to the pack in accordance with the present invention.

Almost immediately after the film has been folded in at the sides and onto the bottom of the foremost pack and each succeeding pack, the said pack travels over a series of rollers 50, 50 which are located at the respective sides of the conveyor 10 as best shown in FIG. 6. It will be seen in FIG. 6 that there are three such rollers mounted on each of several shafts 52, 52 which are spaced apart longitudinally of the conveyor. These shafts 52, 52 extend inwardly from the sides of the conveyor 10 at an angle so that they are also directed slightly toward the upstream end of the said conveyor. With this angular disposition of the rollers and shafts, as each pack is moved over the said rollers by the flight bar chain mechanism, the rollers tend to pull the film inwardly from the sides of the pack at the bottom thereof and thereby draw the film more tightly across the top and at the sides of each pack. Additionally, the rollers provide a compressive force on the glued area of film and pack to facilitate the setting of the glue.

It is to be observed that the rollers and shafts are spaced along the conveyor 10 for a sufficient longitudinal distance to accommodate the foremost and at least one additional pack. That is, there are at least two successive packs which have been completely wrapped at the top and sides by the shrink film and wherein the shrink film continues from the foremost to the subsequent pack and to each succeeding pack. Thus, it will be readily understood that after the longitudinal marginal portions of the film have been folded inwardly at the bottom of the first two packs and into glued engagement therewith, it will no longer be necessary to manually withdraw the film 34 from the roll 30. That is, the movement of the packs by the flight bar conveyor structure with the film secured thereto continues to feed the film from the roll.

Shortly after a pack is advanced off the series of rollers, the film is severed between it and the succeeding pack. This is shown in FIG. 1B wherein a suitable cutter mechanism 54 is illustrated. This cutter mechanism includes a vertically reciprocable rod 56 at each side of the conveyor 10 and a bracket 58 mounted on each such rod. A heated wire (not shown) is suspended between the transversely opposed brackets so that as the rods 56 at the respective sides of the conveyor are thrust downwardly, the heated wire will pass through the enfolded film between adjacent packs to sever the film. Obviously, the cutter mechanism 54 is to be reciprocated so that the film is severed after each pack passing on the conveyor 10.

The packs with the severed film are advanced by the conveyor 28 into the shrink tunnel. The application of heat in the tunnel causes the film to shrink into drum tight relationship onto the pack at the top, sides, and also at the ends of the pack as is shown in FIG. 7.

The invention claimed is:

1. Apparatus for wrapping packs of articles with shrink film on a roll in sufficient width to more than cover the top and sides of each pack, said apparatus comprising a conveyor for advancing the packs longitudinally in spaced apart relationship, means for supporting the roll and guiding film therefrom onto the advancing packs including an inverted U-shaped guide straddling the packs and inclined toward the upstream end of the conveyor to fold film being advanced through the guide with the foremost pack downwardly at the sides of the packs to present an inwardly facing marginal portion of film extending below the packs at each side thereof and adjacent a longitudinal marginal portion on the bottom of the packs at each side, means for applying glue to one of said adjacent marginal portions at each side of each pack, means for folding the marginal portions of the film inwardly on the marginal portions of the foremost and at least the next adjacent pack at both sides thereof to effect a glued connection, a series of rotatable rollers angularly disposed along the conveyor at each side thereof to support the marginal portions of each pack passing thereover to tighten the film at the sides of the packs and to press the glued connections, and cutter means for severing the film between adjacent glued packs prior to shrinking the film thereon.

2. Apparatus for shrink film wrapping as set forth in claim 1 wherein the said inverted U-shaped guide is inclined at an angle from the conveyor which does not exceed 45°.

3. Apparatus for shrink film wrapping as set forth in claim 2 wherein the means for supporting the roll holds it generally transversely of and over the conveyor, and the film is moved therefrom toward the upstream end of the conveyor and then downwardly to and through the inverted U-shaped guide.

4. Apparatus for shrink film wrapping as set forth in claim 3 wherein the packs are supported in trays and the glue is applied to the longitudinal marginal portions at the bottom of the trays.

References Cited

UNITED STATES PATENTS

| 2,980,245 | 4/1961 | Stoker | 53—30 XR |
| 3,161,999 | 12/1961 | Klusmire | 53—30 |
| 3,239,991 | 3/1966 | Copping | 53—30 |
| 3,283,470 | 11/1966 | Oelze et al. | 53—33 |

GRANVILLE Y. CUSTER, Jr., *Primary Examiner.*